Dec. 24, 1968   G. KIPER   3,417,683
EXPOSURE CONTROLLING STRUCTURE FOR PHOTOGRAPHIC CAMERAS
Filed April 9, 1965   3 Sheets-Sheet 1

*Fig.1*

INVENTOR.
GERD KIPER
BY
Michael S. Striker
Att'y

United States Patent Office 3,417,683
Patented Dec. 24, 1968

3,417,683
EXPOSURE CONTROLLING STRUCTURE FOR PHOTOGRAPHIC CAMERAS
Gerd Kiper, Unterhaching, Munich, Germany, assignor to Agfa Aktiengesellschaft, Leverkusen, Germany
Filed Apr. 9, 1965, Ser. No. 446,890
Claims priority, application Germany, Apr. 24, 1964, A 45,859
22 Claims. (Cl. 95—10)

ABSTRACT OF THE DISCLOSURE

A photographic camera wherein the armature (41) of a relay (31) prevents movement of shutter blades (3, 4) when the charge of the battery (25) for the relay decreases below an arbitrarily selected minimum level.

---

The present invention relates to photographic cameras, and more particularly to an exposure controlling structure for such cameras. Still more particularly, the invention relates to improvements in an exposure controlling structure of the type which comprises a source of electrical energy.

It is an important object of my present invention to provide an electrical exposure controlling structure which is constructed and assembled in such a way that the user of the camera automatically realizes that the source of electrical energy is satisfactory or that the source requires recharging or replacement.

Another object of the invention is to provide an exposure controlling structure which automatically prevents the user from taking a picture if the quantity of electrical energy stored in the source drops below a predetermined minimum level.

A further object of the invention is to provide an exposure controlling structure of the above outlined characteristics which can be incorporated in or combined with many types of shutter mechanisms for photographic cameras.

An additional object of the invention is to provide an exposure controlling structure which is not prone to malfunction, which adds little to the bulkiness of a photographic camera, and whose operation is fully automatic and takes place in response to normal manipulation of a photographic camera.

A concomitant object of my invention is to provide an improved shutter mechanism which is combined with an exposure controlling structure of the above outlined characteristics.

Another object of the invention is to provide an exposure controlling structure which prevents the user of a camera from taking a picture when the energy stored in a battery of the exposure meter is such that the exposure meter is likely to furnish an inaccurate reading.

An additional object of my invention is to provide an exposure controlling structure which consumes little electrical energy and which can be readily combined with nearly all types of modern shutter mechanisms.

Briefly stated, one feature of my present invention resides in the provision of a camera which includes shutter means comprising at least one ring or an analogous shutter member movable between a cocked position and a rest position, release means operative to move or to effect movement of the shutter member from the one to the other of such positions, blocking means movable between blocking and unblocking positions to respectively prevent and permit movement of the shutter member to the other position, and electrical exposure controlling means cooperating with the blocking means for normally moving the same to unblocking position in response to operation of the release means. The exposure controlling means comprises a source of electrical energy and a control element connected with the source into a normally open circuit and arranged to move the blocking means to unblocking position in response to completion of the circuit on operation of the release means and contingent on a predetermined minimum level of energy which is stored in the source. Thus, if the quantity of energy stored in the source drops below a permissible minimum level, the control element is unable to move the blocking means to unblocking position and the shutter member is prevented from reaching the other of its positions. For example, the shutter member may constitute a ring which is connected with and controls movements of shutter blades, and the control element may comprise a relay which is energized when the circuit of the source is completed to thereby rock a blocking lever or analogous blocking means from the path of the ring so that the latter can be cocked if the quantity of energy stored in the source is above a given level. Otherwise, the relay cannot displace the blocking lever and the shutter member cannot be cocked.

The novel features which are considered as characteristic of the invention are set forth in particular in the appended claims. The improved exposure controlling structure itself, however, both as to its construction and its mode of operation, together with additional features and advantages thereof, will be best understood upon perusal of the following detailed description of certain specific embodiments with reference to the accompanying drawings, in which:

Figure 1:
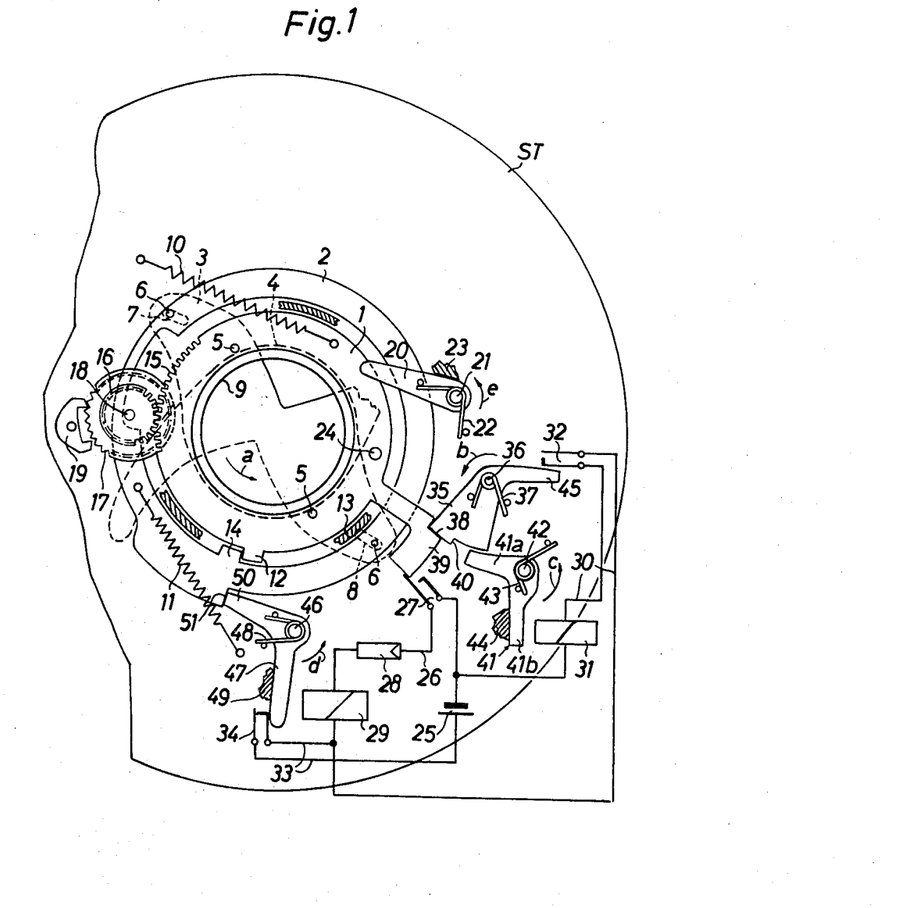
FIG. 1 is a somewhat schematic partly sectional illustration of a first shutter mechanism which is combined with an exposure controlling structure embodying one form of my invention.

The shutter mechanism of FIG. 1 comprises two shutter members in the form of rings 1, 2 which are rotatable with reference to each other. The leading ring 1 carries pins 5 which serve to transmit motion to sectors or blades 3 and 4, each such blade being pivotable about the respective pin 5. It is clear that the number of blades may exceed two. The trailing ring 2 carries pins 6 which respectively extend into slots 7, 8 provided in the blades 3 and 4. When the rings 1, 2 are moved with reference to each other, the blades 3, 4 will pivot about the respective pins 5. In FIG. 1, the rings 1, 2 of the shutter mechanism are shown in cocked position; therefore, the blades 3 and 4 overlap each other in the region of the exposure opening 9 through which the light rays must pass to reach the film.

If the leading ring 1 is released, it rotates in a counterclockwise direction, as viewed in FIG. 1, and causes the blades 3, 4 of the shutter mechanism to define a lens aperture so that the camera will make an exposure, i.e., the blades 3, 4 are then pivoted in a sense to allow passage of light rays through at least a portion of the exposure opening 9. The trailing ring 2 serves to return the blades 3, 4 to sealing position. Helical springs 10 and 11 are connected with the rings 1, 2 on the one hand and with a stationary support ST on the other hand, and their function is to bias the respective rings in a counterclockwise direction.

The leading ring 1 carries a radially extending projection or nose 12 which can move into and from abutment with a fixed stop 13 and which abuts against an inwardly extending radial projection or nose 14 of the trailing ring 2 when the ring 1 is being cocked and moves toward the position shown in FIG. 1. The direction in which the leading ring 1 may rotate to move into abutment with the stop 13 is indicated by an arrow $a$. The leading ring 1 is further provided with a segmental rack 15 which meshes with a pinion 16 mounted on a shaft 18. The shaft 18 carriees a ratchet wheel 17 which cooperates with the pallets of a twin pawl 19, the parts 15 to 19 together forming a retard mechanism of conventional design and serving to insure that the leading ring 1 rotates at a constant speed when it is allowed to follow the bias of the spring 10 and rotates from its cocked to its rest position in the direction indicated by the arrow $a$.

The shutter mechanism further comprises a cocking lever 20 which is fixedly secured to a cocking shaft 21 and is biased by a return spring, here shown as a torsion spring 22, so that it normally abuts against a fixed stop 23. The cocking shaft 21 is rotatable by a handgrip member, not shown, which can also serve to actuate the film transporting mechanism of the camera. In order to cock the rings 1 and 2, the shaft 21 must rotate the lever 20 in a counterclockwise direction (see the arrow $e$) whereby the lever 20 engages and entrains a stud 24 on the leading ring 1 to rotate this ring in a direction counter to that indicated by the arrow $a$.

The exposure controlling structure of the camera includes a source 25 of electrical energy one pole of which is connected with a lead 26 containing a control switch 27 connected in series with a photoelectric resistor 28 and a control relay 29. In a manner well known from the art of cameras, the resistor 28 changes its resistance with changes in the intensity of light impinging on the resistor. A second lead 30 is connected in parallel with the lead 26 and contains a second control relay 31 connected in series with a second control switch 32. The circuit of FIG. 1 also includes a third lead 33 which contains a normally closed main switch 34 and is connected to the other pole of the source 25. The switch 34 tends to open if its movable contact is released.

The shutter mechanism is released by release means including a release lever 35 which is fixed to a release shaft 36. The shaft 36 is rotatable by a tripping or actuating lever, not shown. The release lever 35 is biased by a return spring, here shown as a torsion spring 37, which tends to rotate the release lever 35 in a direction counter to that indicated by an arrow $b$. The release lever 35 comprises a first shoulder 38 which extends into a notch provided on a radially outwardly extending arm 39 of the leading ring 1 when the ring 1 is cocked. Thus, the shoulder 38 of the release lever 35 normally holds the leading ring 1 against rotation in the direction indicated by the arrow $a$ to maintain this ring in cocked position. The release lever 35 further comprises a second shoulder 40 which may be engaged by or is free to bypass the arm 41a of a first two-armed blocking lever 41. The shoulder 40 can engage the blocking lever 41 when the shaft 36 of the release lever 35 is caused to rotate in a counterclockwise direction (see the arrow $b$). The blocking lever 41 is mounted on a shaft 42 and is biased by a torsion spring 43 which tends to pivot it in a direction counter to that indicated by an arrow $c$ so that the arm 41b of the blocking lever 41 normally abuts against a fixed stop 44. When the control relay 31 is energized, it may cause the arm 41b to move away from the stop 44 and to allow the shoulder 40 to bypass the arm 41a. In other words, when the control relay 31 is energized to such an extent that the arm 41a is withdrawn from the path of the shoulder 40, the release lever 35 is free to pivot in the direction indicated by the arrow $b$ so as to move the shoulder 38 away from the notch in the arm 39 and the leading ring 1 is then free to follow the bias of the spring 10 and moves to its rest position. The disance between the shoulder 40 and arm 41a is seleced in such a way that the shoulder 38 continues to engage the arm 39 when the shoulder 40 reaches the end face of the arm 41a, i.e., the blocking lever 41 must be pivoted by the control relay 31 in order to allow the lever 35 to release the leading ring 1 and to allow light rays to reach the unexposed frame of the film.

The release lever 35 further carries a projecting arm 45 which can close the control switch 32 when the release shaft 36 is rotated in the direction indicated by the arrow $b$. The control switch 32 is open when the rings 1 and 2 are cocked but will close during the first stage of movement of the shoulder 40 toward the arm 41a of the blocking lever 41 so that the circuit of the control relay 31 is completed and the relay may withdraw the arm 41a from the path of the shoulder 40.

The control switch 27 tends to remain closed but is opened automatically in response to movement of the arm 39 against the bias of the spring 10. When the rings 1 and 2 are cocked, the movable contact of the switch 27 is engaged by the arm 39 and is held away from the fixed contact. The control switch 34 normally tends to remain open but is closed by a second blocking lever 47 which is biased by a torsion spring 48 so as to normally abut against a fixed stop 49. The blocking lever 47 is mounted on a shaft 46 and its pawl 50 normally engages a radially extending face 51 provided on the trailing ring 2. When the control relay 29 is sufficiently energized, it can pivot the blocking lever 47 in a counterclockwise direction (arrow $d$) so that the face 51 of the trailing ring 2 may bypass the pawl 50. In other words, and in order that the trailing ring 2 may follow the bias of the spring 11, the control relay 29 must be energized to such an extent that it attracts the downwardly extending arm of the blocking lever 47 and moves this arm away from the stop 49 through an angle which suffices to withdraw the pawl 50 from the path of the face 51. The lever 47 then assumes an unblocking position.

It will be seen that the first blocking lever 41 can prevent movement of the leading ring 1 from a cocked to a rest position through the intermediary of the release lever 35, and that the second blocking lever 47 can directly prevent movement of the trailing ring 2 from a cocked to a rest position. The release means including the parts 35, 36, 45 may complete the circuit of the first control relay 31, and the arm 39 completes the circuit of the second control relay 29 in response to movement of the lever 41 from its blocking to its unblocking position.

If the operator decides to take a picture, he actuates the tripping lever to turn the release shaft 36 and to pivot the release lever 35 in a counterclockwise direction (arrow $b$) whereby the projection 45 closes the control switch 32 and completes the circuit of the first control relay 31 even before the shoulder 40 reaches the tip of the arm 41a on the blocking lever 41, i.e., before the shoulder 38 is withdrawn from the path of the arm 39. If the quantity of energy stored in the source 25 is above a predetermined minimum level and suffices to energize the control relay 31 to such an extent that the arm 41a is fully withdrawn from the path of the shoulder 40 (against the bias of the torsion spring 43 and in the direction indicated by the arrow $c$), the release lever 35 is disengaged from the arm 39 and the leading ring 1 is free to follow the bias of the spring 10 to pivot the blades 3, 4 and to form a lens aperture through which the light rays pass in order to impinge against the film.

As soon as the leading ring 1 begins to rotate in the direction indicated by the arrow $a$, the arm 39 releases the movable contact of the control switch 27 so that the latter completes the circuit of the control relay 29 which attracts the blocking lever 47 provided, of course, that the quantity of energy stored in the source 25 suffices to energze the control relay 29 to such an extent that the blocking lever 47 moves its pawl 50 away from the face 51 of the trailing ring 2. The photoelectric resistor 28 offers to the flow of electric current through the lead 26 a resistance which is commensurate with the intensity of light so that the control relay 29 is energized with a certain delay which determines the exact time when the trailing ring 2 starts to rotate in the direction of arrow $a$ in order to close the lens aperture. In other words, the blades 3, 4 will reseal the opening 9 with a delay which is dependent on the illumination of the photographed object. The trailing ring 2 may begin to rotate before the nose 12 of the leading ring 1 reaches the fixed stop 13, i.e., the shutter mechanism need not be opened to the maximum possible extent because the blades 3, 4 need not expose the entire opening 9. Consequently, the just described shutter mechanism can determine the exact area of the lens aperture.

In order to recock the rings 1 and 2, the user rotates the shaft 21 of the cocking lever 20 in a counterclockwise direction (arrow $e$). The lever 20 engages the stud 24 on the leading ring 1 and rotates this ring against the bias of the spring 10. The nose 12 engages the nose 14 on the trailing ring 2 and rotates the latter against the bias of the spring 11. The release lever 35 is biased by the torsion spring 37 and moves its shoulder 38 into a notch of the arm 39 as soon as the arm 39 reaches the position shown in FIG. 1. At the same time, the arm 39 opens the control switch 27 to deenergize the control relay 29 whereby the spring 48 compels the pawl 50 to reengage the face 51 of the ring 2, i.e., the lever 47 then returns to blocking position. The arm 45 of the release lever 35 allows the control switch 32 to open so that the control relay 31 is deenergized and the spring 43 returns the arm 41a of the blocking lever 41 to the blocking position of FIG. 1 in which the arm 41a extends into the path of the shoulder 40 on the release lever 35.

If the energy stored in the source 25 is insufficient, the control relay 31 is not energized in response to closing of the control switch 32 and the arm 41a remains under the bias of the spring 43 so that it prevents the release lever 35 from disengaging its shoulder 38 from the arm 39 on the leading ring 1. Thus, the operator is then unable to turn the shaft 36 to such an extent that the shoulder 38 would be disengaged from the arm 39 and the camera cannot take a picture. The operator then knows that the source 25 must be replaced by a fresh source of electrical energy or that the source 25 must be recharged.

If the energy stored in the source 25 is too low, the resistance of the resistor 28 does not reflect the exact intensity of light impinging on this resistor, and the relay 29 or 31 is then unable to move the blocking lever 41 or 47 to its unblocking position.

Figure 2:
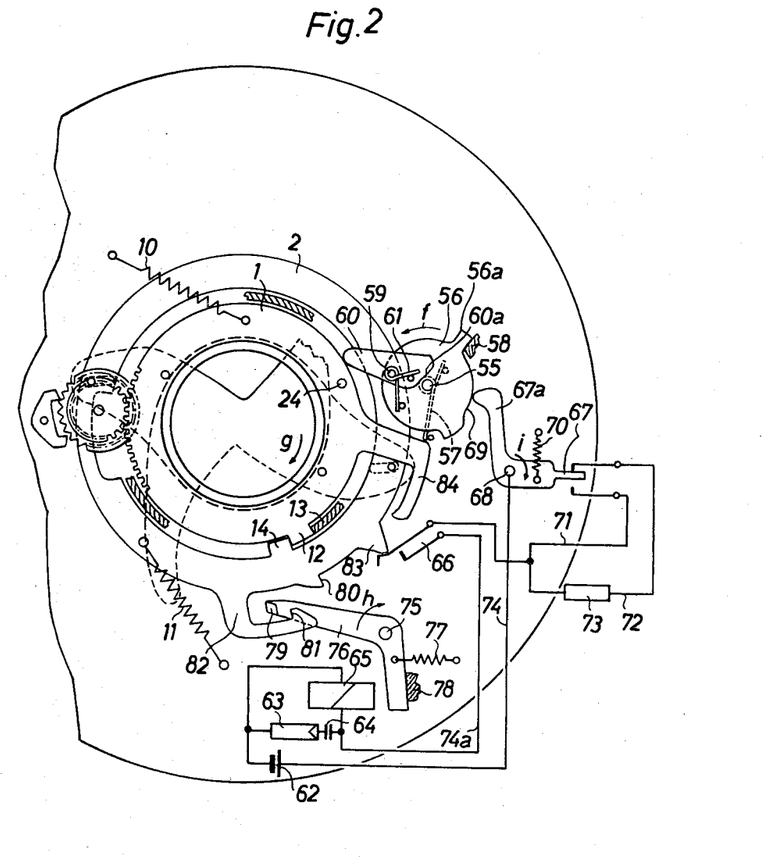
FIG. 2 is a similar schematic partly sectional illustration of a second shutter mechanism which cooperates with a modified exposure controlling structure.

FIG. 2 illustrates an automatic shutter mechanism. A tripping lever (not shown) is attached to an actuating shaft 55 which serves to cock as well as to release the shutter mechanism. The shaft 55 carries a lever 56 which is biased by a return spring in the form of a torsion spring 57. This spring tends to maintain a lobe 56a of the lever 56 in abutment with a fixed stop 58. A pin 59 is mounted on the lever 56 and supports a rockable pawl 60 which serves as a combined cocking and release means for the rings 1, 2. A torsion spring 61 operates between the lever 56 and pawl 60 in a sense to maintain a face 60a of the pawl in abutment with the shaft 55. The free end or tip of the pawl 60 serves to cock the leading ring 1 by cooperating with the stud 24 and to release the ring 1 when it moves past the stud 24.

The exposure controlling structure which cooperates with the trailing ring 2 after the pawl 60 releases the leading ring 1 again comprises an electric circuit which operates with a delay determined by the illumination of the object whose picture is to be taken. This structure includes a source 62 of electrical energy one pole of which is connected with a delay device in the form of a photoelectric resistor 63. The resistor 63 is connected in series with a capacitor 64 and in parallel with a control relay 65. The capacitor 64 is connected in series with a main switch 66 and with a two-way control switch 67. The control switch 67 includes a movable contact which is rigid with a lever 67a rockable on a pivot 68. The nose of the lever 67a constitutes a follower which tracks a cam face 69 on the lever 56. A helical spring 70 serves to keep the follower 67a in permanent engagement with the cam face 69. The movable contact of the switch 67 may engage a fixed contact at the end of a lead 71 or a fixed contact at the end of a lead 72. The lead 72 contains a fixed resistor 73. A lead 74 connects the movable contact of the switch 67 with the other pole of the source 62, and a further lead 74a connects the control relay 65 with one contact of the main switch 66.

The relay 65 controls the angular position of a blocking lever 76 which is pivotable on a fixed shaft 75 and can move between a blocking position and an unblocking position. This blocking lever 76 is biased by a helical spring 77 which tends to maintain its downwardly extending arm in abutment with a fixed stop 78. The other arm of the blocking lever 76 comprises a projecting portion 79 which can cooperate with either of two abutments 80, 81 of the trailing ring 2. The abutment 80 is formed by a radially extending face of the trailing ring 2 and the abutment 81 is a face provided on a leg 82 which is integral with and extends in the circumferential direction of the ring 2.

The trailing ring 2 further comprises a control lobe 83 which serves to temporarily close the normally open main switch 66 when the rings 1 and 2 are being cocked, i.e., when the trailing ring 2 is rotated against the bias of the spring 11. The leading ring 1 is provided with an arm 84 which is also capable of closing the main switch 66.

If he wishes to take a picture, the operator rotates the shaft 55 in the direction indicated by an arrow $f$. The cocking pawl 60 then engages the stud 24 and rotates the leading ring 1 in the direction indicated by an arrow $g$. The nose 12 of the leading ring 1 moves away from the fixed stop 13 and entrains the nose 14 on the trailing ring 2 so that the trailing ring shares such angular movement of the leading ring 1. As the trailing ring 2 begins to rotate in the direction indicated by the arrow $g$, its lobe 83 closes the main switch 66 so that the circuit of the resistor 73 (lead 72) and control relay 65 (leads 74, 74a) is completed. If the energy stored in the source 62 is sufficient, the control relay 65 is energized and attracts the lower arm of the blocking lever 76 against the bias of the spring 77 (arrow $h$). The projection 79 moves out of the path of the abutment 81 and the trailing ring 2 is free to continue its rotary movement in the direction of the arrow $g$, i.e., the rings 1 and 2 are free to be cocked.

When the lobe 83 moves beyond the movable contact of the main switch 66, the control relay 65 is deenergized and the blocking lever 76 immediately returns to its blocking position of abutment with the fixed stop 78. The lever 56 continues to rotate in the direction of the arrow $f$ and its cam face 69 changes the angular position of the lever 67a (arrow $i$) so that the movable contact of the two-way switch 67 engages the terminal of the lead 71. Shortly before the pawl 60 advances past the stud 24, the arm 84 of the leading ring 1 engages and closes the main switch 66 so that the control relay 65 is energized and causes the blocking lever 76 to rock in the direction indicated by the arrow $h$. Consequently, the projection 79 of the blocking lever 76 moves in front of the radial abutment 80.

As soon as the pawl 60 releases the stud 24 (in response to continued rotation of the lever 56 in the direction of the arrow $f$), the leading ring 1 is released to follow the bias of the spring 10 and rotates in a counterclockwise direction, as viewed in FIG. 2, to assume a position of rest. Therefore, the shutter mechanism defines a lens aperture through which the light rays coming from an object impinge against the film.

In following the bias of the spring 10, the leading ring 1 moves its arm 84 upwardly, as viewed in FIG. 1, and allows the main switch 66 to open so that the control relay 65 is deenergized but with a certain delay which is determined by the resistance of the photoelectric resistor 63 and by the capacitor 64. The resistor 63 acts not unlike a bypass resistor because the equalizing current flows through the bypass connection and back to the winding of the relay 65. The exact duration of the delay depends on the resistance of the photoelectric resistor 63, i.e., on the intensity of light to which the resistor 63 is exposed.

When the control relay 65 is deenergized with a delay determined by the photoelectric resistor 63, the blocking lever 76 can follow the bias of the spring 77 and returns to its blocking position, i.e., into abutment with the fixed stop 78. Consequently, the projection 79 moves away from the face 80 so that the trailing ring 2 is released and can rotate under the bias of the spring 11 to close the lens aperture. The trailing ring 2 then rotates in a counterclockwise direction, as viewed in FIG. 2.

As soon as the tripping lever is released, the spring 57 returns the lever 56 to the position of FIG. 2. During such return movement of the lever 56, the pawl 60 pivots on its pin 59 as soon as it engages the stud 24 and bypasses this stud so that it can return to the position of FIG. 2 and is ready to recock the rings 1 and 2 in response to repeated rotation of the shaft 55 in the direction indicated by the arrow f.

If the energy stored in the source 62 is insufficient, and if the user wishes to cock the rings 1 and 2, the lobe 83 of the trailing ring 2 will close the main switch 66 but the control relay 65 cannot rock the blocking lever 76 against the bias of the spring 77 so that the projection 79 remains in the path of the abutment 81 and prevents further rotation of the trailing ring 2. Since the rings 1 and 2 are coupled by the noses 12, 14, the leading ring 1 also ceases to rotate. In other words, the rings 1, 2 cannot rotate to such an extent that the pawl 60 would move past the stud 24 because the stud is bypassed only at the time when the rings are fully cocked. Thus, the user cannot make an exposure because the projection 79 continues to engage the abutment 81 on the arm 82 of the trailing ring 2.

The shutter mechanism of FIG. 2 constitutes a simplification of the mechanism shown in FIG. 1 because it utilizes a single control relay 65 which not only unblocks the rings 1, 2 during cocking if the energy stored in the source 62 is sufficient but which also prevents such unblocking if the energy stored in the source is below a level necessary to effect a movement of the projection 79 out of the path of the abutment 81. Thus, the control relay 65 will automatically determine the exact moment when the shutter mechanism closes (in dependency on the resistance of the photoelectric resistor 63), and the control relay will prevent the shutter mechanism from defining a lens aperture if the quantity of energy stored in the source 62 is below a predetermined minimum level.

Figure 3:
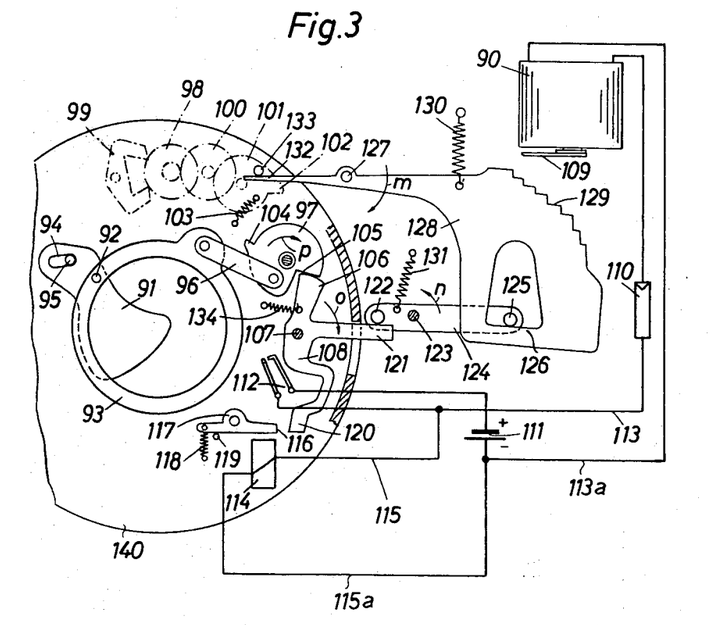
FIG. 3 is another schematic partly sectional illustration of a third shutter mechanism which is combined with a further exposure controlling structure.

Referring finally to FIG. 3, there is shown a third shutter mechanism which is combined with a light meter 90 of the moving-coil type. The shutter mechanism comprises a series of sector-shaped shutter blades 91 (only one shown) which are pivotable on pins 92 provided on a shutter ring 93. Each blade 91 is further formed with an elongated cam slot 94 which receives a fixed pin 95. The ring 93 is coupled to a link 96 which is articulately connected with a main drive member 97 biased by a suitable spring (not shown).

In order to select different exposure times, the shutter mechanism comprises a retard mechanism including a ratchet wheel 98 which cooperates with a twin pawl 99 and is driven by an intermediate gear 100. The gear 100 is driven by a control gear 101 which comprises a projection 102 and is biased by a spring 103. The spring 103 tends to maintain the projection 102 in the path of a lobe 104 on the main drive member 97. The main drive member is further provided with a radially extending shoulder 105 which is engaged by an arm 106 of a three-armed release lever 108. The lever 108 is rockable on a fixed shaft 107. The arm 106 will engage the shoulder 105 when the ring 93 is cocked.

The electrical exposure controlling structure includes the aforementioned light meter 90 which is provided with a pointer 109 and is connected with leads 113, 113a. The lead 113 contains a photoelectric resistor 110 which is connected in series with a main switch 112 and with one pole of a source 111 of electrical energy. The source 111 may consist of a battery or a miniature storage cell.

A control relay 114 is connected in parallel with the light meter 90 by leads 115, 115a and 113a. This relay controls a blocking lever 116 which is rockable on a fixed shaft 117 and is biased by a spring 118 so that it normally abuts against a fixed stop 119. When the control relay 114 is deenergized, the blocking lever 116 extends into the path of an arm 120 forming part of the release lever 108. The lever 108 is then prevented from unblocking the main drive member 97, i.e., the arm 106 then abuts against the shoulder 105.

The third arm 121 of the release lever 108 engages a pin 122 on one arm of a two-armed lever 124 which is fixed to a rockable shaft 123 and is biased by a spring 131. The shaft 123 is connected with a non-illustrated tripping lever. The other arm of the lever 124 carries a pin 125 which engages a cam face 126 provided on a sensing lever 128 rockable about a fixed shaft 127. The sensing lever 128 comprises a toothed portion 129 which can cooperate with the pointer 109 of the light meter 90. A spring 130 tends to rock the sensing lever 128 in a counterclockwise direction, as viewed in FIG. 3, and serves to move the toothed portion 129 in engagement with the pointer 109. The aforementioned spring 131 acts on the lever 124 and tends to maintain the sensing lever 128 in the neutral position shown in FIG. 3. The bias of the spring 131 is stronger than that of the spring 130, i.e., the spring 131 tends to rotate the levers 124, 128 in a clockwise direction. An arm 132 of the sensing lever 128 is engaged by a pin 133 provided on the control gear 101 which is biased by the spring 103. A return spring 134 serves to move the release lever 108 to the position shown in FIG. 3. One end of the spring 134 is anchored in a stationary supporting plate 140 of the shutter mechanism.

FIG. 3 illustrates the ring 93 in cocked position. In order to take a picture, the user rotates the shaft 123 in a counterclockwise direction (arrow n). The shaft 123 rotates the actuating lever 124 in the same direction so that the pin 122 rocks the arm 121 of the release lever 108 (arrow o) and the release lever 108 closes the normally open main switch 112. The main switch 112 completes the circuit of the light meter 90 and control relay 114 and, if the energy stored in the source 111 is satisfactory, the control relay 114 is energized and attracts the right-hand arm of the blocking lever 116 against the bias of the spring 118 so that the path for the arm 120 of the release lever 108 is free and the arm 106 can move away from the shoulder 105 of the main drive member 97. The circuit of the control relay 114 is completed through the photoelectric resistor 110 and the resulting delay is utilized by the light meter 90 to move the pointer 109 to a position which is indicative of the lighting conditions.

The shaft 123 continues to rotate in the direction of the arrow n whereby the spring 130 moves the toothed portion 129 of the sensing lever 128 against the pointer 109. The pointer 109 is engaged by that tooth of the portion 129 which is indicative of the lighting conditions so that the sensing lever 128 is arrested in an angular position selected by the light meter 90. The control gear 101 is thereby rotated by the spring 103 which tends to maintain the pin 133 in abutment with the arm 132 of the sensing lever 128. The retard mechanism including the parts 98, 99 is now adjusted to assume a position which corresponds to the lighting conditions.

The main drive member 97 is released by the arm 106 shortly before the shaft 123 completes its angular movement in the direction of the arrow $n$. The non-illustrated spring then rotates the main drive member 97 in the direction indicated by an arrow $p$. The link 96 transmits such motion to the ring 93 which causes the blades 91 to first form and to thereupon close a lens aperture. The duration of exposure is determined by the setting of the retard mechanism, i.e., by the angular position of the control gear 101 which, in turn, is controlled by the arm 132 of the sensing lever 128. The projection 102 of the control gear 101 extends into the path of the lobe 104 on the main drive member 97.

If the energy stored in the source 111 is not sufficient to energize the control relay 114, the release lever 108 can be rocked only to such an extent that it closes the main switch 112, but such closing of the main switch 112 will not result in movement of the blocking lever 116 out of the path of the arm 120, i.e., the release lever 108 will remain in blocking position and will prevent release of the main drive member 97. The position of the arms 106, 120 is selected in such a way that the arm 106 continues to abut against the shoulder 105 if the arm 120 engages the blocking lever 116.

It is clear that the exposure controlling structure of my invention may be utilized in all types of shutter mechanisms, i.e., not only in those which are actually shown in the drawings but also in curtain shutters, iris shutters and others.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In a camera, in combination, shutter means including at least one member movable between a cocked position and a rest position; blocking means movable between blocking and unblocking positions to respectively prevent and permit movement of said member between said cocked and rest positions; and electrical exposure controlling means comprising a source of electrical energy and at least one control element connected with said source in a normally open circuit and arranged to move said blocking means to said unblocking position in response to completion of said circuit and as long as said source stores at least a predetermined minimum amount of energy.

2. In a camera, in combination, shutter means including at least one member movable between a cocked position and a rest position; release means operative to effect movement of said member from the one to the other of said positions; blocking means movable between blocking and unblocking positions to respectively prevent and permit movement of said member to said other position; and electrical exposure controlling means comprising a source of electrical energy and at least one control element connected with said source in a normally open circuit and arranged to move said blocking means to said unblocking position in response to completion of said circuit on operation of said release means and as long as said source stores at least a predetermined minimum amount of energy.

3. In a camera, in combination, shutter means including at least one member movable between a cocked position and a rest position; release means operative to effect movement of said member from the one to the other of said positions; blocking means movable between blocking and unblocking positions to respectively prevent and permit movement of said member to said other position; and electrical exposure controlling means cooperating with said blocking means for normally moving the same to said unblocking position in response to operation of said release means, said exposure controlling means comprising a source of electrical energy and at least one control element connected with said source in a normally open circuit and arranged to move said blocking means to said unblocking position in response to completion of said circuit on operation of said release means and as long as said source stores at least a predetermined minimum amount of energy.

4. In a camera, in combination, shutter means including at least one member movable between a cocked position and a rest position; release means operative to effect movement of said member from the one to the other of said positions; blocking means movable between blocking and unblocking positions to respectively prevent and permit movement of said member to said other position; and electrical exposure controlling means comprising a source of electrical energy and at least one relay connected with said source in a normally open circuit and arranged to be energized and to move said blocking means to said unblocking position in response to completion of said circuit on operation of said release means and as long as said source stores at least a predetermined minimum amount of energy.

5. In a camera, in combination, shutter means including at least one member movable between a cocked position and a rest position; release means operative to effect movement of said member from the one to the other of said positions; blocking means movable between blocking and unblocking positions to respectively prevent and permit movement of said member to said other position; resilient means for normally maintaining said blocking means in said blocking position; and electrical exposure controlng means comprising a source of electrical energy and at least one control element connected with said source in a normally open circuit and arranged to move said blocking means to said unblocking position in response to completion of said circuit on operation of said release means and as long as said source stores at least a predetermined minimum amount of energy, the action of said control element upon said blocking means being too weak to move said blocking means against the bias of said resilient means when said source stores less than said predetermined minimum amount of energy.

6. In a camera, in combination, shutter means including movable blade means and ring means operatively connected with said blade means, said ring means being movable between cocked and rest positions; release means operative to effect movement of said ring means from one to the other of said positions; blocking means movable between blocking and unblocking positions to respectively prevent and permit movement of said ring means to said other position; and electrical exposure controlling means comprising a source of electrical energy and at least one relay connected with said source in a normally open circuit and arranged to be energized and to move said blocking means to said unblocking position in response to completion of said circuit on operation of said release means and as long as said source stores at least a predetermined minimum amount of energy.

7. In a camera, in combination, shutter means including movable blade means and ring means operatively connected with said blade means, said ring means being movable between cocked and rest positions; release means operative to effect movement of said ring means from said rest position to said cocked position; blocking means movable between blocking and unblocking positions to respectively prevent and permit movement of said ring means to said cocked position; and electrical exposure controlling means comprising a source of electrical energy and at least one relay connected with said source in a normally open circuit and arranged to be energized and to move said blocking means to said unblocking position in response to completion of said circuit on operation of said release means and as long as said source stores at least a predetermind minimum amount of energy.

8. In a camera, in combination, shutter means including at least one member movable between a cocked position and a rest position; blocking means movable between blocking and unblocking positions to respectively prevent and permit movement of said member between said cocked and rest positions; and electrical exposure controlling means comprising a source of electrical energy, at least one control element connected with said source in a normally open circuit and arranged to move said blocking means to said unblocking position in response to completion of said circuit and as long as said source stores at least a predetermined minimum amount of energy, and light meter means connected in parallel with said control element.

9. In a camera, in combination, shutter means including at least one member movable between a cocked position and a rest position; a pair of blocking means each movable between a blocking position and an unblocking position to respectively prevent and permit movement of said member between said cocked and rest positions; and electrical exposure controlling means comprising a source of electrical energy and a pair of control elements connected with said source in a normally open circuit and each arranged to move one of said blocking means to said unblocking position in response to completion of its circuit and as long as said source stores at least a predetermined minimum amount of energy, said control elements being connected in parallel with each other and each thereof comprising a relay.

10. In a camera, in combination, shutter means including at least one member movable between a cocked position and a rest position; release means operative to effect movement of said member from the one to the other of said positions; blocking means movable between blocking and unblocking positions to respectively prevent and permit movement of said member to said other position; and electrical exposure controlling means comprising a source of electrical energy, normally open switch means connected in circuit with said source, and relay means connected in said circuit and energizable in response to closing of said switch means and resulting completion of said circuit on operation of said release means to move said blocking means to said unblocking position as long as said source stores at least a predetermined minimum amount of energy.

11. In a camera, in combination, shutter means including at least one member movable between a cocked position and a rest position; release means operative to effect movement of said member from the one to the other of said positions; a pair of blocking means each movable between a blocking position and an unblocking position to respectively prevent and permit movement of said member; and electrical exposure controlling means comprising a source of electrical energy, a pair of relays connected with said source in a normally open electric circuit and each energizable to thereby move one of said blocking means from said blocking position to said unblocking position on operation of said release means and as long as said source stores at least a predetermined minimum amount of energy, said relays being connected in parallel and said circuit further including a normally open main switch arranged to be closed on operation of said release means.

12. In a camera, in combination, shutter means including at least one member movable between a cocked position and a rest position; release means operative to effect movement of said member from said cocked position to said rest position; blocking means movable between blocking and unblocking positions to respectively prevent and permit movement of said member to said rest position; and electrical exposure controlling means comprising a source of electrical energy, normally open main switch means adapted to be closed by said release means and connected in circuit with said source, and relay means connected in said circuit and energizable in response to closing of said switch means and resulting completion of said circuit on closing of said main switch means by said release means to move said blocking means to said unblocking position as long as said source stores at least a predetermined minimum amount of energy.

13. In a camera, in combination, a shutter mechanism including a first and a second ring each movable between a cocked position and a rest position, and shutter blade means articulately connected with said rings and adapted to define a lens aperture in response to movement of said first ring to rest position and to seal said aperture in response to movement of said second ring to rest position; cocking means for moving said rings to said cocked positions; first and second blocking means movable between blocking and unblocking positions for respectively preventing and permitting movement of the corresponding ring to said rest position; and electrical exposure controlling means comprising a source of electrical energy, a first and a second relay each connected with said source in a normally open circuit and each energizable on completion of said circuit to move the corresponding blocking means to said unblocking position as long as said source stores at least a predetermined minimum amount of energy, and normally open main switch means connected in said circuit and arranged to close in response to movement of said first ring to said rest position, said relays being connected in parallel with each other.

14. In a camera, in combination, a shutter mechanism including a first and a second ring each movable between a cocked position and a rest position, and shutter blade means articulately connected with said rings and adapted to define a lens aperture in response to movement of said first ring to rest position and to seal said aperture in response to movement of said second ring to rest position; cocking means for moving said rings to said cocked positions; first and second blocking means movable between blocking and unblocking positions for respectively preventing and permitting movement of the corresponding rings to said rest positions; release means for normally holding said rings against movement to said rest positions and being operable to be disengaged from said rings; and electrical exposure controlling means comprising a source of electrical energy, a first and a second relay each connected with said source in a normally open circuit and each energizable on completion of said circuit to move the corresponding blocking means to said unblocking position when the quantity of energy stored in said source remains above a predetermined minimum level, said relays being connected in parallel with each other, normally open main switch means connected in said circuit and arranged to close in response to movement of said first ring to rest position, a normally open first control switch connected in series with said first relay and arranged to be closed in response to operation of said release means, and a photoelectric resistor connected in series with said second relay for determining the exact amount of delay with which said second relay is energized on completion of its circuit as a function of scene brightness, said main switch means being in series wth said second relay and being arranged to open in response to movement of said second blocking means to unblocking position.

15. In a camera, in combination, a shutter mechanism including a first and a second shutter member each movable between a cocked position and a rest position, and blade means articulately connected with said shutter members and adapted to define a lens aperture in response to movement of the first shutter member to said rest position and to seal said lens aperture in response to movement of the second shutter member to said rest position; blocking means movable between blocking and unblocking positions to respectively prevent and permit movement of said shutter members between said cocked and rest positions, said blocking means comprising a portion arranged to engage one of said shutter members and to prevent movement of said one shutter member in the blocking position thereof; electrical exposure controlling means comprising a source of electrical energy, a relay connected in circuit with said source, said circuit further including normally open main switch means and delay means including a photoelectric resistor arranged to determine as a function of scene brightness the exact amount of delay with which said relay is energized when said source stores at least a predetermined minimum amount of energy, said relay being arranged to move said blocking means to unblocking position in response to completion of said circuit and as long as the energy stored in said source remains above said predetermined minimum level; and release means operative to effect movement of said shutter members from the one to the other of their positions and to close said switch means so that said circuit is completed in response to operation of said release means.

16. A structure as set forth in claim 15, wherein said resistor is connected in parallel with said relay and wherein said circuit further comprises capacitor means connected in series with said resistor.

17. In a camera, in combination, a shutter mechanism including a first and a second shutter member each movable between a cocked position and a rest position, one of said shutter members comprising a pair of abutments, and blade means articulately connected with said shutter members and adapted to define a lens aperture in response to movement of the first shutter member to said rest position and to seal said lens aperture in response to movement of the second shutter member to said rest position; blocking means movable between blocking and unblocking positions to respectively prevent and permit movements of said shutter members between said cocked and rest positions, said blocking means comprising a portion arranged to engage said one shutter member and to prevent movement of said one shutter member in the blocking position thereof, said portion of said blocking means engaging one of said abutments of said one shutter member when said one shutter member assumes said cocked position and said blocking means assumes said blocking position and said portion of said blocking means engaging the other abutment of said one shutter member when said blocking means assumes said blocking position and said one shutter member is moved from said rest position to said cocked position thereof; electrical exposure controlling means comprising a source of electrical energy, a relay connected in circuit with said source, said circuit further including normally open main switch means and delay means including a photoelectric resistor arranged to determine as a function of scene brightness the exact amount of delay with which said relay is energized when the quantity of electrical energy stored in said source remains above a predetermined minimum level, said relay being arranged to move said blocking means to unblocking position in response to completion of said circuit and as long as the energy stored in said source remains above said predetermined minimum level; and release means operative to effect movement of said shutter members from the one to the other of their positions and to close said main switch means so that said circuit is completed in response to operation of said release means.

18. A structure as set forth in claim 17, wherein said shutter mechanism is of the automatic type and wherein said release means comprises a cocking member operative to cock said shutter members and spring means for automatically returning said shutter members to their respective rest positions in response to disengagement of said cocking member from said one shutter member, said second shutter member being allowed to move to said rest position with a delay determined by said resistor.

19. A structure as set forth in claim 17, wherein said relay is energized twice during movement of said shutter members from rest position to cocked position and back to rest position.

20. In a camera, in combination, a shutter mechanism including a first and a second shutter member each movable between a cocked position and a rest position, and blade means articulately connected with said shutter members and adapted to define a lens aperture in response to movement of the first shutter member to said rest position and to seal said lens aperture in response to movement of the second shutter member to said rest position; blocking means movable between blocking and unblocking positions to respectively prevent and permit movements of said shutter members between said cocked and rest positions, said blocking means comprising a portion arranged to engage one of said shutter members and to prevent movement of said one shutter member in the blocking position thereof; electrical exposure controlling means comprising a source of electrical energy, a relay connected in circuit with said source, said circuit further including normally open main switch means and delay means including a photoelectric resistor connected in parallel with said relay and arranged to determine as a function of scene brightness the exact amount of delay with which said relay is energized when the quantity of electrical energy stored in said source remains above a predetermined minimum level, and capacitor means connected in series with said photoelectric resistor, said relay being arranged to move said blocking means to unblocking position in response to completion of said circuit and as long as the energy stored in said source remains above said predetermined minimum level; and release means operative to effect movement of said shutter members from the one to the other of their positions and to close said main switch means so that said circuit is completed in response to operation of said release means, said circuit further including a two-way control switch comprising a pair of fixed contacts and a movable contact engaging one of said fixed contacts and movable by said release means to engage the other fixed contact when said release means moves said shutter members to said cocked positions, a first lead connecting said one fixed contact with said relay, a fixed resistor connected in said first lead, and a second lead connecting the other fixed contact with said main switch means.

21. In a camera, in combination, shutter means including at least one member movable between a cocked position and a rest position; blocking means movable between a blocking position and an unblocking position to respectively prevent and permit movement of said member from the one to the other of said positions; and electrical exposure controlling means comprising a source of electrical energy, relay means connected with said source in a normally open circuit and arranged to move said blocking means to said release position in response to completion of said circuit and as long as said source stores at least a predetermined minimum amount of energy, and delay means comprising photosensitive resistor means connected in parallel with said relay means for controlling the exact amount of delay with which said relay means moves said blocking means to release position as a function of scene brightness upon completion of said circuit.

22. In a camera, in combination, shutter means including at least one member movable between a cocked position and a rest position; blocking means movable between blocking and unblocking positions to respectively prevent and permit movement of said member between said cocked and rest positions; release means operative to effect movement of said member between said cocked and rest positions; and electrical exposure controlling means including a source of electrical energy, a control relay connected in circuit with said source, said circuit further including normally open switch means arranged to close on operation of said release means, and delay means including a photoelectric resistor connected in parallel with said relay to control the exact amount of delay with which said member moves to said rest position upon completion of said circuit by said release means, said relay being energized on completion of said circuit and with a delay determined by said resistor as a function of scene brightness to move said blocking means to unblocking position as long as said source stores at least a predetermined minimum amount of energy.

References Cited

UNITED STATES PATENTS 3,165,989  1/1965  Kiper _______________ 95—10

OTHER REFERENCES

Kiper: German application 1,125,270, printed Mar. 8, 1962.

NORTON ANSHER, *Primary Examiner.*

J. F. PETERS, JR., *Assistant Examiner.*

U.S. Cl. X.R.

95—53